(12) United States Patent  
Jahromi

(10) Patent No.: US 9,435,611 B1  
(45) Date of Patent: Sep. 6, 2016

(54) COMBINATION GUN SIGHT WITH SINGLE EYEPOINT

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

( * ) Notice: Subject to any disclaimer, the term of this patent is extended or adjusted under 35 U.S.C. 154(b) by 0 days.

(21) Appl. No.: 14/872,126

(22) Filed: Sep. 30, 2015

Related U.S. Application Data

(63) Continuation-in-part of application No. 14/732,524, filed on Jun. 5, 2015.

(51) Int. Cl.
*F41G 1/38* (2006.01)
*G02B 23/12* (2006.01)

(52) U.S. Cl.
CPC ............... *F41G 1/38* (2013.01); *G02B 23/12* (2013.01)

(58) Field of Classification Search
CPC ............ F41G 1/38; F41G 3/06; F41G 1/345; F41G 1/473; F41G 3/065; F41G 1/30; F41G 3/326; F41G 3/08; F41G 1/40; F41G 1/54; F41G 11/003; F41G 1/32; F41G 3/165; F41G 11/004; F41G 1/01; F41G 1/35; F41G 1/44; F41G 7/303; F41G 11/001
See application file for complete search history.

(56) References Cited

U.S. PATENT DOCUMENTS

| 1,563,373 A | * | 12/1925 | Kauch | .................. F41G 3/06 356/3 |
| 2,388,673 A | * | 11/1945 | Brown | .................. G02B 15/00 359/420 |

(Continued)

OTHER PUBLICATIONS

Swanepoel, D. (May 31, 2014). Vector Sideswipe 2.5-10x40 Scope Green Laser and Red Dot Sight. Retrieved Nov. 28, 2015, from https://www.youtube.com/watch?v=8Mjj5icadw4.*

(Continued)

*Primary Examiner* — Troy Chambers
*Assistant Examiner* — Joshua Semick

(57) ABSTRACT

This invention describes an ergonomic combination sight for small arms. According to one embodiment, the combination sight comprises a reflector sight mounted on top of a telescopic sight. A refracting wedge prism is included in the optical layout of the telescopic sight to tilt the viewing axis of the telescopic sight towards the viewing axis of the reflector sight. This feature provides better ergonomics since a shooter can aim through the reflector sight or the telescopic sight using the same head position.

4 Claims, 1 Drawing Sheet

(56) References Cited

U.S. PATENT DOCUMENTS

| | | | | |
|---|---|---|---|---|
| 4,247,161 | A * | 1/1981 | Unertl, Jr. | G02B 27/36 359/424 |
| 5,349,469 | A * | 9/1994 | Francis | G02B 23/14 359/420 |
| 5,862,001 | A * | 1/1999 | Sigler | G02B 1/06 359/211.1 |
| 7,142,357 | B2 * | 11/2006 | Greenslade | F41G 1/32 359/353 |
| 7,319,557 | B2 * | 1/2008 | Tai | G02B 23/12 359/350 |
| 8,599,481 | B2 * | 12/2013 | Thomas | F41G 1/345 359/399 |
| 8,692,995 | B2 * | 4/2014 | Barth | F41G 7/004 250/214.1 |
| 8,749,887 | B2 * | 6/2014 | Jahromi | F41G 1/38 359/399 |
| 9,069,172 | B1 * | 6/2015 | Morley | G02B 23/12 |
| 2005/0039370 | A1 * | 2/2005 | Strong | F41G 1/473 42/130 |
| 2011/0041377 | A1 * | 2/2011 | Thomas | F41G 1/345 42/120 |
| 2014/0259853 | A1 | 9/2014 | Crispin | |
| 2015/0082680 | A1 * | 3/2015 | Szapiel | G02B 23/10 42/130 |
| 2016/0061567 | A1 * | 3/2016 | Regan | G02B 23/10 42/119 |

OTHER PUBLICATIONS

SR556. (Nov. 1, 2010). Ruger Forum. Retrieved Nov. 28, 2015, from http://rugerforum.net/ruger-semi-auto/25885-eotech-mount-sr-556-above-scope.html.*

Albregtsen, F. (2008). Reflection, refraction, diffraction, and scattering. Retrieved Nov. 28, 2015, from https://www.uio.no/studier/emner/matnat/ifi/INF-GEO4310/h09/undervisningsmateriale/imaging-kap2.pdf.*

* cited by examiner

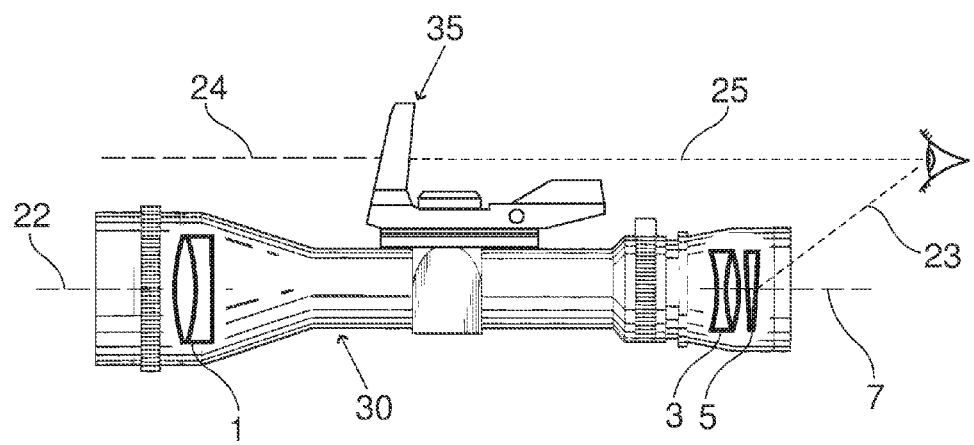

COMBINATION GUN SIGHT WITH SINGLE EYEPOINT

I. CROSS-REFERENCE TO RELATED APPLICATIONS

This is a continuation-in-part of application Ser. No. 14/732,524 filed on Jun. 5, 2015 by the present inventor, which is incorporated herein by reference in its entirety.

II. FIELD OF THE INVENTION

This application relates to optical gun sights, specifically to a combination sight comprising a low-magnification sight and a high-magnification sight.

III. BACKGROUND OF THE INVENTION

In modern warfare, soldiers are often required to fire at both long and short-range targets interchangeably and at a rapid pace. This introduces challenging requirements on the choice of a suitable optical sight. For close quarter combat, the U.S. military utilizes the M68 reflector sight. The M68 which is also known as Close Combat Optic (CCO) can be used with both eyes open which results in quick target acquisition and greater situational awareness. Reflector sights, which are also known as reflex sights or red-dot sights, have no magnification and are unsuited for engaging targets beyond 100 m. For open terrain warfare, the US military uses the M150 telescopic sight also known as the Advanced Combat Optical Gunsight (ACOG). The ACOG is a fixed-power telescopic sight with a bullet-drop compensating reticle specifically designed for the US Army's M4 weapon system. While providing means for accurate aiming at distant targets, the ACOG is not suited for urban environments due to its relatively narrow field of view and limited eye relief.

To overcome the above limitations, some military units have furnished their battle rifles with a combination sight. A combination sight is constructed by attaching a non-magnifying sight such as a red-dot sight to a telescopic sight. The Hensoldt Dual Optic sight used by the German army is an example of a combination sight. Used on the German military G36 battle rifles, the Hensoldt Dual Optic sight combines a telescopic sight with 3× power and a reflector sight mounted on top of the telescopic sight. The reflector sight is calibrated for aiming at 100 m. The reflector sight is illuminated by ambient light during the day and uses battery powered illumination for use at night. The reticle in the 3× telescopic sight is designed for firing at 200 m and has bullet drop compensation markings for: 200, 400, 600 and 800 m.

A combination sight enables a solder to aim at both long-range and short-range targets interchangeably and at a rapid pace. However, this configuration results in a major ergonomic problem: the telescopic sight and the reflector sight require two separate head positions on the rifle. This problem has been noticed by the designers of optical weapon sights and several solutions have been suggested. Some representative prior art are reviewed below.

U.S. Pat. No. 5,349,469 issued to Melvin Francis on Sep. 20, 1994 discloses a combination sight consisting of a high-power telescopic sight and a low-power telescopic sight. This solution uses a tilted erecting prism to incline the viewing axis of one of the telescopes. This makes it possible to position the exit pupils of the two telescopic sights close to each other. While an elegant solution, this design can only be applied to telescopic sights which use a prismatic image erecting system. Variable-magnification (zoom) telescopic sight which are the most common type of telescopic sights use a lens-based erector system, therefore the solution described in this patent is not applicable to them. Another problem associated with this solution is that it requires tilting the entire eyepiece assembly of one of the telescopic sights. Tilting the entire eyepiece assembly imposes a multitude of geometrical restrictions on the size of the optical elements that comprise the eyepiece.

U.S. patent application Ser. No. 13/843,445 filed by Quint Crispin on Mar. 15, 2013 discloses a telescopic sight which features a zig-zag optical path to facilitate mounting it together with a reflector sight. In this solution, the objective lens of the telescopic sight is positioned on the side of the weapon. This causes alignment problems when the sight is to be provisioned with a trajectory-compensating reticle. In addition, this solution has an unwieldy zig-zag shape which is mountable only on certain type of rifles.

U.S. patent application Ser. No. 14/036,325 filed by Stanislaw Szapiel on Sep. 25, 2013 describes a reflector sight equipped with a pair of Risley prisms such that the viewing axis of the reflector sight cab be inclined towards the viewing axis of a telescopic sight. The inclined viewing axis allows a soldier to view the sight image of the reflector sight and the telescopic sight from a single head position. This is an interesting solution but it undermines the principal advantage of the reflector sight: since the view through the reflector sight is deviated, it will not be possible for the human brain to merge it with the view from the unaided eye. Accordingly, the sight described by Szapiel is unsuited for close quarter combat where both eyes need to be open.

What is needed is an ergonomic combination sight which does not require a soldier to change his head position, is easy to mount and can be used with both eyes open. The present invention introduces a combination sight that fulfils these requirements without the limitations associated with the prior art mentioned above.

IV. SUMMARY OF THE INVENTION

This invention is a continuation-in-part of application Ser. No. 14/732,524 filed by the present inventor. In the parent application, a novel telescopic sight featuring inclined viewing axis was disclosed. Additionally, a novel configuration comprising a reflector sight mounted together with a telescopic sight with inclined viewing axis was described and illustrated but not explicitly claimed. The present application describes and claims the above mentioned configuration.

According to a first embodiment, the invention comprises a reflector sight mounted on top of a telescopic sight that has inclined viewing axis. The telescopic sight's viewing axis is tilted upwards using a refractive wedge prism as described in the parent application.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

FIG. 1 is a schematic showing a combination sight comprising a reflector sight mounted on top of a telescopic sight. The viewing axis of the telescopic sight is inclined upward to produce a single eyepoint for the combination sight.

VI. DETAILED DESCRIPTION OF THE INVENTION

A. Principle of Operation

The principle of operation of the present invention is the same as described in the parent application. The reader is referred to the parent application sections VI.A through VI.D where the principle of a telescopic sight with inclined viewing axis is disclosed.

B. First Embodiment of the Invention

A first preferred embodiment of the invention is shown in FIG. 1. With reference to this FIGURE, a combination sight with single eyepoint comprises a reflector sight 35 mounted on top of a telescopic sight 30. The reflector sight is mounted such that its aiming axis 24 extends substantially parallel to the aiming axis 22 of the telescopic sight. The telescopic sight has a viewing axis 23 which is inclined upwards towards the viewing axis 25 of the reflector sight. The common eyepoint of the combination sight will be located at the intersection of the reflector sight's viewing axis and the telescopic sight's viewing axis. The existence of a common eyepoint allows the shooter to aim through both the reflector sight and the telescopic sight from a single head position.

The telescopic sight 30 is constructed in accordance with the general optical layouts shown in FIG. 4(a), 4(b), 5(a) or 5(b) of the parent application. These figures show a telescopic sight whose viewing axis is inclined downwards. A wedge prism 5 is shown in these figures with its base facing downwards. In the present embodiment, the wedge prism 5 should be mounted with its base facing upwards so that the viewing axis of the telescopic sight is inclined towards the reflector sight. (An example of this prism configuration can be seen in FIG. 7(b) in the parent application.)

To achieve an ergonomic head position, the wedge prism 5 should be designed such that it produces a predetermined upward inclination in the viewing axis 23 of the telescopic sight 30. A person of ordinary skill in the art of telescopic sight design would know how to determine the proper amount of inclination based on ergonomic considerations as well as the physical dimensions of the top and bottom sights.

C. How to Use the Invention

To use the combination sight described in this invention, a shooter can mount the combination sight on his rifle and adjust the point of aim of the top and bottom sights such that they aim accurately at near (say 50 m) and far (say 200 m) targets, respectively. The top reflector sight is used for aiming at near targets. The bottom telescopic sight is used for engaging distant targets. When engaging distant targets, the shooter can use the top sight for quick target acquisition and then switch his gaze to the lower sight for more accurate aiming. Since the top and bottom sights have a single eyepint, target acquisition and aiming will be much faster than existing combination sights that require repositioning of the shooter's head.

D. Advantages

Based on the above descriptions of the invention, a number of advantages over prior art are readily apparent:
1. The combination sight described in the invention can be used for aiming at nearby targets with both eyes open. This is because the viewing axis of the reflector sight is not inclined.
2. The invention is easy to make and can use existing telescopic sight or reflector sight designs.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation and without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:
1. The physical housing of the sights, the mounting means, and the mechanism to adjust point of aim for windage and elevation are not described in the present specifications. A person of ordinary skill in the art of making optical gun sights would be familiar with adapting a suitable housing, a suitable mounting means, and proper adjustment mechanism from existing art for use with the present invention.
2. For simplicity and brevity, the details of constructing a reflector sight are not covered in the present application. A person of ordinary skill in the art of optical gun sight design would know how to design and construct a reflector sight suitable for the present invention.
3. For the purpose of this invention, a holographic sight is considered a form of reflector sight and might equally be used.

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A combination sight for designating a weapon's point of aim when pointed at a target, comprising:
   a. a telescopic sight; said telescopic sight comprising an objective lens, and an eyepiece lens; said telescopic sight having a first aiming axis and a first viewing axis, said eyepiece lens having an optical axis;
   b. a reflector sight; said reflector sight having a second aiming axis and a second viewing axis; said reflector sight being mounted on top of said telescopic sight such that said second aiming axis is substantially parallel to said first aiming axis,
   c. a refractive wedge prism, said refractive wedge prism having an apex and a base; said refractive wedge prism being positioned on the eyepiece optical axis; said refractive wedge prism being positioned after said eyepiece lens; said refractive wedge prism being mounted with its base pointing upwards such that it tilts said first viewing axis towards said second viewing axis;

whereby a shooter can aim through said telescopic sight and said reflector sight using the same head position.

2. The combination sight of claim 1 wherein said reflector sight is comprised of a red dot sight.

3. The combination sight of claim 1 wherein said reflector sight is comprised of a holographic sight.

4. The combination sight of claim 1 wherein said refractive wedge prism is achromatic.

* * * * *